Patented Dec. 10, 1935

2,023,590

UNITED STATES PATENT OFFICE 2,023,590

AZO DYE AND METHOD FOR ITS PREPARATION

Emmet F. Hitch and Miles A. Dahlen, Wilmington, Del., and Martin E. Friedrich, Carneys Point, N. J., assignors to E. I. du Pont de Nemours & Company, Wilmington, Del., a corporation of Delaware No Drawing. Application July 27, 1933, Serial No. 682,463

12 Claims. (Cl. 260—95)

This invention relates to the preparation of new azo dyes, and more particularly refers to water-insoluble azo dyes having the following general formula:

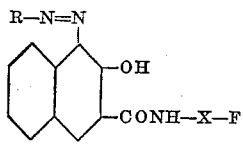

in which R represents the residue of an arylamine and X represents an arylene nucleus.

It is an object of this invention to produce new azo dyes. A further object is to produce water-insoluble azo dyes of the ice color series. A still further object is to produce insoluble pigments, or dyes which may be coupled on the fiber. Additional objects will become apparent from a consideration of the following description.

These objects are attained according to the herein described invention which in its preferred embodiment comprises coupling a diazotized arylamine, suitable for the preparation of ice colors, with a fluorinated arylamide of 2-3-hydroxy-naphthoic acid. Most satisfactory results are, in general, obtained by diazotizing an arylamine of the benzene, diphenyl, naphthalene, diphenylamine, diphenylether, azobenzene, anthraquinone, or carbazole series, particularly those of the benzene series. The fluorinated arylamide is preferably a member of the benzene or naphthalene series. Where dyes of the ice color series are to be produced both of the aforementioned components should be free from water-solubilizing groups, for example carboxylic or sulfonic acid groups.

This invention may be more readily understood by a consideration of the following illustrative examples, in which the quantities are stated in parts by weight:

Example 1

40 grams of cotton piece goods, which had previously been well boiled and dried, were impregnated with a solution of the p-fluoranilide of 2-3-hydroxy-naphthoic acid prepared as follows:

8 parts of the arylamide were pasted with about 10 parts of alcohol, and 10 parts of caustic soda (35° Bé.) were added. When the arylamide was completely dissolved, water was added until the total volume was about 1600 parts.

The piece goods were then well wrung out, and without rinsing or drying, developed with a solution of the diazo salt prepared from m-chloraniline which was produced as follows:

12.7 parts of the free base were stirred with 200 parts of water and 24 parts of hydrochloric acid (22° Bé.). 150 parts of ice were then added, and the diazotization was carried out with 8 parts of sodium nitrite dissolved in 25 parts of water. When the diazotization reaction was finished, the solution was filtered (if necessary); and just before coupling, 20 parts of sodium acetate were added.

The dye cloth was rinsed, soaped at the boil and again rinsed, and dried. In this manner, a bright reddish-orange dyeing having an excellent fastness to light and washing was obtained. The formula of the dye is probably:

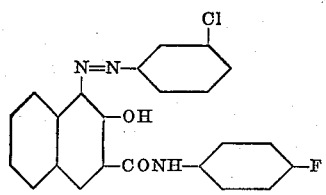

Example 2

Cotton piece goods were impregnated with the solution of the p-fluoroanilide of 2-3-hydroxy-naphthoic acid as described above, and were developed in a solution of the diazo salt from 3-nitro-4-amino-toluene which was prepared as follows:

15.2 parts of the free base, 37.5 parts of water, and 28.0 parts of hydrochloric acid (sp. gr.=1.19), were stirred for half an hour at room temperature. The mixture was then cooled to 10° C. with the aid of external cooling, and the diazotization was carried out by adding rapidly a solution of 7 parts sodium nitrite, dissolved in 20 parts of water. When the diazotization was finished the mass was filtered; and just before coupling, the solution was neutralized with sodium acetate to remove the mineral acidity.

The dyed cloth was rinsed and soaped at the boil, rinsed, and dried. A bright red dyeing having excellent fastness to light and washing was obtained. The dye probably has the formula:

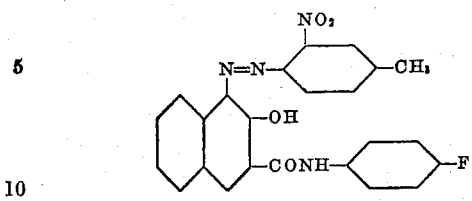

Example 3

Cotton piece goods were impregnated with a solution of the p-fluoroanilide of 2-3-hydroxy-naphthoic acid, as described in Example 1, and were developed in a solution of the diazo salt from 4-4'-diamino-diphenylamine, which was prepared as follows:

4 parts of the free base were dissolved in 20 parts of hot water, with agitation. 50 parts of cold water, 20 parts of ice, and 23 parts of hydrochloric acid (20° Bé.) were added. 3 parts of sodium nitrite dissolved in 5 parts of water were then added slowly, with agitation. When the diazotization was finished, the solution was neutralized with chalk, and 5 parts of magnesium sulfate were added.

The dyed cloth was rinsed, soaped at the boil, again rinsed and dried. A navy blue dyeing, having a very good fastness to light and washing, was formed. The formula for the dye is probably:

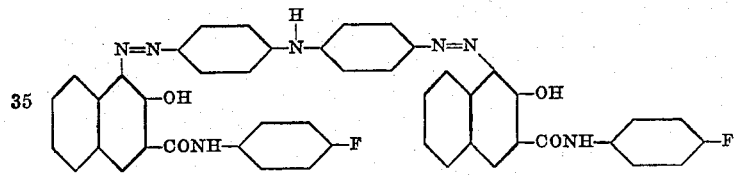

Example 4

A solution of the 2-3-hydroxy-naphthoyl derivative of m-fluoraniline was made up by pasting 8 parts of the intermediate with about 10 parts of alcohol, and then 10 parts of caustic soda (35° Bé.) were added. When the arylamide was dissolved, water was added until the total volume was about 1600 parts.

To a portion of the solution obtained above was added an equivalent amount of a solution of the diazo salt from 4-chlor-2-nitro-aniline, which was obtained as follows:

17 parts of 1-amino-2-nitro-4-chlorbenzene were dissolved in 30 parts of sulfuric acid (66° Bé.). The solution was poured into 200 parts of cold water with stirring. The diazotization was carried out at 10-15° C., with a solution of 6.9 parts of sodium nitrite dissolved in 25 parts of water. If necessary, the solution can be given a charcoal clarification filtration.

When the coupling reaction had been completed, the pigment which had formed was filtered, washed well with water, then stirred with alcoholic-sodium hydroxide to remove the unreacted m-fluoranilide of 2-3-hydroxy-naphthoic acid. It was dried and recrystallized from nitrobenzene. The melting point of the bluish-red pigment obtained in this manner was 319-321° C. It has the probable formula:

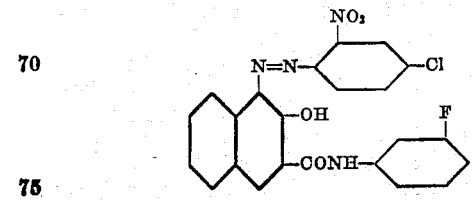

Example 5

42.6 parts of 4-chlor-2-amino-toluene were dissolved in a mixture of 76 parts of hydrochloric acid (37%) and 150 parts of water. The solution was agitated, cooled with external cooling to about 5° C., and then diazotized at 0-5° C., with a solution of 21 parts of sodium nitrite dissolved in 50 parts of water. Ice may be added to maintain the desired temperature of the solution during diazotization. The solution was filtered, and added gradually to a solution of 43 parts of piperidine-A-carboxylic acid, and 450 parts of water, at 0-5° C. Soda ash was added to maintain alkalinity to phenolphthalein papers. The solution was filtered, salted out, and the oil separated from the liquors. The oil was dried in a vacuum at low temperatures. The solid obtained by drying the oil was about 85% pure. (M. W. 306.)

A printing paste was made up from:

5.2 parts of a dry mixture of—
    3.2 parts of the 2-3-hydroxy-naphthoyl derivative of p-fluoraniline
    3.0 parts of the solid diazoimino compound obtained above
3.0 parts of caustic soda of 40° Bé.
65.0 parts of starch-tragacanth thickener
26.8 parts of water 100.0

Cloth was printed from an engraved roll with the above paste, then subjected to the action of live steam containing the vapors of acetic acid.

In this manner a red printing, having very good fastness properties was obtained. The dye has the probable formula:

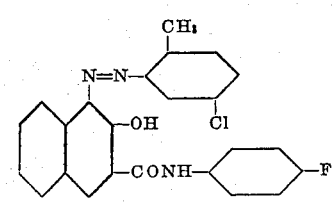

Example 6

2-5-dichloraniline was diazotized and converted to the sodium salt of the anti-diazotate as described in U. S. P. 531,975. The anti-diazotate was purified by recrystallization from water, and was filtered, washed with cold brine (15%) and dried at 50-60° C. It had a dry purity of 80.0% (M. W. 213).

Bleached cloth was printed with a printing paste made up as follows:

4.7 parts of a dry mixture of—
    2.0 parts of the 2-3-hydroxy-naphthoyl derivative of p-fluoraniline
    2.7 parts of the dry anti-diazotate described above
3.0 parts of caustic soda of 40° Bé.
65.0 parts of starch-tragacanth thickener
27.3 parts of water 100.0

The printed goods were developed in the usual manner in an acetic acid ager at 100° C. In this manner a bright orange print, having very good fastness properties, was obtained. The new color has the probable formula:

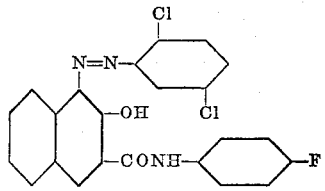

Using other arylamines of Formula (4) as diazo components, other new colors of Formula (1) having excellent fastness properties may be formed on the fiber. The following table illustrates a number of these combinations.

By the term "water-solubilizing groups", as used in the specification and claims of this application, is meant sulfonic acid and carboxylic acid groups.

A large number of fluorinated arylamides of 2-3-hydroxynaphthoic acid may likewise be used in place of the components previously selected for this purpose. These arylamides are preferably selected from members of the benzene or naphthalene series, although the invention is by no means restricted thereto. Furthermore, the arylamides selected may have substituted thereon one or more of the various non-water-solubilizing groups, for instance alkyl, aralkyl, alkoxy, aryloxy, halogen, and nitro groups. Representative arylamines selected from the large number which are suitable for use in forming the

| 2-3-hydroxy-naphthoyl derivative of— | Diazonium salt from— | Shade | Light fastness | Washing fastness | Chlorine |
|---|---|---|---|---|---|
| p-Fluoraniline | 5-nitro-2-amino-anisole | Bluish-red | Good | Excellent | |
| Do | 4-chlor-2-nitro-aniline | Red | Excellent | do | |
| Do | 4-nitro-2-amino-anisole | Scarlet | Good | do | |
| Do | 2,5-dichloraniline | Orange | Excellent | do | |
| Do | Dianisidine | Blue | Good | do | |
| o-Fluoraniline | m-chloraniline | Orange | Excellent | do | |
| Do | 5-nitro-2-amino-anisole | Bluish-red | Good | do | |
| Do | 3-nitro-4-amino-toluene | Red | do | do | |
| Do | 4-chlor-2-nitro-aniline | do | Very good | do | |
| Do | 2-5-dichloraniline | Scarlet | Excellent | do | |
| Do | 4-nitro-2-amino-anisole | do | Good | do | |
| Do | Dianisidine | Blue | do | do | |
| Do | 4,4'-diamino-diphenylamine | do | do | do | |
| 4-fluor-3-amino-toluene | m-chloraniline | Orange | do | do | |
| Do | 4-nitro-2-amino-anisole | Bright red | do | do | |
| 3-flour-4-methoxy-aniline | m-chlor-aniline | Bluish-scarlet | Very good | Good | Good. |
| Do | 2-5-dichlor-aniline | Yellowish-scarlet | do | do | Do. |
| Do | 4-nitro-2-amino-anisole | Scarlet | Good | do | Do. |
| Do | m-nitro-p-toluidine | Bluish-red | Very good | do | Do. |
| Do | p-chlor-o-toluidine | Bluish-scarlet | do | do | Very good. |
| Do | p-chlor-o-nitraniline | Brick-red | Good | do | Do. |
| Do | p-p'-diamino-diphenyl-amine | Black | do | do | Do. |
| Do | 1 - amino - 4 - benzoylamino - 2 - 5 - diethoxy-benzene. | Reddish-navy blue. | do | do | |
| m-flour-aniline | m-chlor-aniline | Orange | Fair | do | Good. |
| Do | 2-5-dichlor-aniline | Scarlet | do | do | Do. |
| Do | 4-nitro-2-amino-anisole | Bluish-scarlet | do | do | Do. |
| Do | 5-nitro-2-amino-anisole | Red | do | do | Do. |
| Do | p-chlor-o-nitro-aniline | Yellowish-red | do | do | Do. |
| Do | p-chlor-o-toluidine | Scarlet | Good | do | Do. |
| Do | 1 - amino - 4 - benzoylamino - 2 - 5 - diethoxy-benzene. | Royal-blue | do | do | Do. |
| Do | p-p'-diamino-diphenyl-amine | Navy-blue | do | do | Do. |
| Do | b-naphthylamine | Yellowish-red | | | |
| Do | p-p'-diamino-diphenyl-ether | Turkey-red | | | |
| Do | o-phenetole-azo-a-napthylamine | Navy-blue | | | |
| Do | a-amino-anthraquinone | Bluish-red | | | |
| Do | 3-amino-carbazole | Violet | | | |
| Do | o-amino-azo-toluene | Garnet | | | |

It is to be understood that the present invention is not limited to the use of components selected from the various classes represented in the examples. Arylamines from numerous other classes, as well as those from the classes previously mentioned, may be diazotized and coupled in accordance with the present invention. For instance, where it is desired to prepare ice colors any of the well known arylamines capable of coupling may be utilized. As previously mentioned arylamines of the benzene, diphenyl, naphthalene, diphenylamine, diphenylether, azobenzene, anthraquinone, and carbazole series particularly those of the benzene series are preferred, although the invention is by no means limited to members of the aforementioned series. Furthermore, these arylamines may have substituted thereon one or more non-water-solubilizing groups. Among such substituents mention may be made of the halogen, alkyl, alkoxy, acylamino, and trifluoro-methyl groups, it being understood that these substituents merely represent a few of the numerous non-solubilizing groups which may be used without departing from the scope of the present invention.

arylamides of 2-3-hydroxy-naphthoic acid, coming within the scope of this invention are:

(1) Fluorinated naphthylamines, such as 1-fluoro - 2 - naphthylamine, 1-fluoro-4-naphthylamine;

(2) Fluorinated toluidines, such as 6-fluoro-2-amino-toluene, 5 - fluoro - 2 - amino-toluene, 2 - fluoro-4-amino-toluene;

(3) Fluorinated xylidines, such as 4-fluoro-5-amino-m-xylene, 5-fluoro-2-amino-p-xylene, 6-fluoro-2-amino-p-xylene;

(4) Fluorinated anisidines, phenetidines, and other alkoxy- and aryloxy-anilines, such as 4-fluoro-2-amino-anisole, 5-fluoro-2-amino-phenetole, 4-fluoro-2-amino-diphenylether;

(5) Halogenated fluoro-anilines, such as 5-chloro-2-fluoro-aniline, 2,5-difluoro-aniline, 4-bromo-2-fluoro-aniline;

(6) Fluoro-nitranilines, such as 4-fluoro-2-nitraniline, 2-fluoro-5-nitraniline.

The arylamides referred to herein may be suspended or dissolved in water and treated with diazo solutions derived from the arylamines, selected according to the instructions previously given. This treatment is carried out under suitable conditions of acidity or alkalinity, coupling occurring with the formation of new insoluble pigments. These pigments may then be separated, washed, purified if desired, and dried. These coupling components may be made by the process described and claimed in U. S. Patent 1,982,661, December 4, 1934.

Where it is desired to dye textile fibers the dyes previously referred to may be produced on the material according to any of the well known processes. For example, the following widely known dyeing processes may be used:

(1) Textile fibers are padded with the arylamides, then immersed in solutions of diazo salts prepared from the arylamines heretofore described, preferably in the presence of acid binding agents such as sodium acetate.

(2) Textile fibers padded as above may be printed with pastes containing the diazo salts, then washed to remove uncoupled arylamides.

(3) Printing pastes may be produced containing the arylamides and anti-diazotates (nitrosamines) prepared from any of the aforementioned arylamines. Textile fibers are then printed with such pastes and subjected to the action of mild acids and heat.

(4) The arylamides may be mixed with diazoimino compounds, derived from the desired arylamines, and printing pastes prepared therefrom. The textile material is then printed therewith and the desired dyes produced thereon by treatment with mild acids at elevated temperatures.

The products heretofore described have, in general, excellent fastness to light, chlorine, washing, and kier-boiling. They are readily prepared, and may be used as pigments or dyes. When used as dyes they impart to textile material attractive colors which are in great demand.

As many apparently widely different embodiments of this invention may be made without departing from the spirit and scope thereof, it is to be understood that the invention is not limited to the specific embodiments thereof except as defined in the appended claims.

We claim:

1. A process for producing azo dyes which comprises coupling a diazotized arylamine with a fluorinated arylamide of 2-3-hydroxy-naphthoic acid.

2. The process of claim 1 wherein the components are free from water-solubilizing groups.

3. The process of claim 1 wherein the arylamine may have substituted thereon members selected from the class consisting of halogen, alkyl, alkoxy, nitro, acylamino, and trifluoromethyl groups, and the arylamide nucleus may have substituted thereon members selected from the class consisting of alkyl, aralkyl, alkoxy, aryloxy, halogen and nitro groups.

4. A process for producing water-insoluble azo dyes which comprises coupling a diazotized arylamine of the benzene series with an arylamide of 2-3-hydroxy-naphthoic acid, prepared from a fluorinated arylamine of the benzene or naphthalene series.

5. A process for producing water-insoluble azo dyes which comprises coupling a diazotized arylamine of the benzene series with a fluoranilide of 2-3-hydroxy-naphthoic acid.

6. Azo dyes having the following general formula:

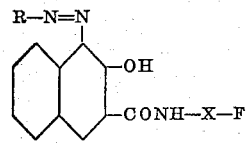

in which R represents the radical of an arylamine, and X represents the radical of an aromatic amine.

7. The dyes defined in claim 6 wherein the components represented by R and X are free from water-solubilizing groups.

8. The dyes defined in claim 6 wherein the aryl nucleus of the arylamine may have substituted thereon members selected from the class consisting of halogen, alkyl, alkoxy, nitro, acylamino, and trifluoromethyl groups, and the arylamide nucleus may have substituted thereon members selected from the class consisting of alkyl, aralkyl, alkoxy, aryloxy, halogen and nitro groups.

9. Water-insoluble azo dyes having the following general formula:

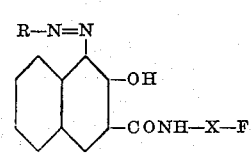

in which R represents the radical of an arylamine of the benzene series, and X represents the radical of an aromatic amine of the benzene or naphthalene series.

10. Water-insoluble azo dyes having the following general formula:

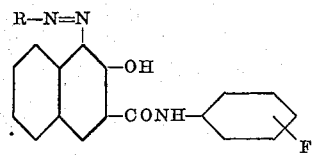

in which R represents the radical of an arylamine of the benzene series.

11. Azo dyes having the following general formula:

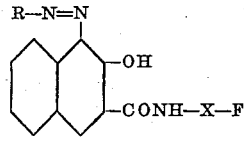

in which R represents the radical of an aromatic diazotizable amine, and X represents the radical of an aromatic amine.

12. Azo dyes having the following general formula:

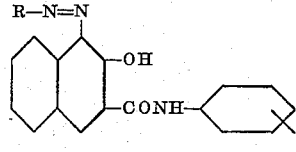

in which R represents the radical of an aromatic diazotizable amine.

EMMET F. HITCH.
MILES A. DAHLEN.
MARTIN E. FRIEDRICH.